(12) United States Patent
Krist et al.

(10) Patent No.: US 6,332,650 B1
(45) Date of Patent: Dec. 25, 2001

(54) ACTUATING ARRANGEMENT FOR A VEHICLE SEAT

(75) Inventors: Rudolf Krist, Ludwigsburg; Bernd Schmidt, Wildberg; Ralf-Henning Schrom, Rottenburg; Volmar Schulz, Weitransdorf, all of (DE); Philip C. Shephard, Birmingham (GB)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/520,800

(22) Filed: Mar. 8, 2000

(30) Foreign Application Priority Data

Mar. 8, 1999 (DE) ............................................. 199 10 084

(51) Int. Cl.$^7$ ....................................................... B60N 2/02
(52) U.S. Cl. .................................... 297/378.12; 297/378.1
(58) Field of Search ........................................ 297/378.12

(56) References Cited

FOREIGN PATENT DOCUMENTS

| 1 824 238 | 9/1963 | (DE) . |
| 1 286 922 | 1/1969 | (DE) . |
| 24 04 216 | 8/1975 | (DE) . |
| 35 04 166 | 8/1986 | (DE) . |
| 41 42 924 | 7/1993 | (DE) . |
| 2 563 716 | 11/1985 | (FR) . |

Primary Examiner—Peter R. Brown
Assistant Examiner—Joseph Edell
(74) Attorney, Agent, or Firm—Crowell & Moring LLP

(57) ABSTRACT

An actuating device is provided for a vehicle seat whose seat back can be folded forward around a pivot axis into a deflected position to facilitate entrance and exit. The seat back is held in its folded-back end position by bilaterally provided rotary drop latches which can be unlocked remotely by a common actuating element in synchronization and with a tension arrangement being provided for remote unlocking. The rotary drop latches are rotationally coupled by a connecting rod and operably connected by a single tension strand with the actuating element.

11 Claims, 2 Drawing Sheets

ACTUATING ARRANGEMENT FOR A VEHICLE SEAT

BACKGROUND AND SUMMARY OF THE INVENTION

This application claims the priority of German application 19910084.5, filed in Germany on Mar. 8, 1999, the disclosure of which is expressly incorporated by reference herein.

The invention relates to an actuating device for a vehicle seat with a seat back that can be folded forward into a deflected position to facilitate entrance and exit. The seat back can be folded forward around a pivot axis into a deflected position to facilitate entry and exit, to with the seat back being secured in its folded-back end position by bilaterally provided rotary drop latches that are synchronously remotely unlockable by a common actuating element and with a tension means arrangement being provided for remote unlocking.

In such an actuating device that can be found in German Patent Document DE 24 04 216 A1, the seat back of a vehicle seat is secured in its folded-back end position by rotary drop latches provided on both sides in the vicinity of fittings. At the upper end of the seat back is a manual lever by which the rotary drop can be remotely unlocked in synchronization by Bowden cables that run on both sides of the seat back. For this purpose, a transmission rod is provided in the upper area of the seat back by which the motion of the Bowden cables is synchronized when the manual lever is actuated.

Under unfavorable conditions, for example as the consequence of excessive lengthening of one of the Bowden cables, incomplete or unilateral unlocking of one of the rotary drop latches can occur so that the seat back can no longer be folded forward smoothly without any problems any longer into its deflected position. To ensure operating safety, a correspondingly higher maintenance expense must be paid.

An actuating device for a vehicle seat is known from French Patent Document FR 25 63 716 in which the seat cushion part can be secured in its folded-back end position by bilaterally provided rotary drop latches. The two rotary drop latches are rotationally coupled with one another by a connecting rod and unlockable remotely in synchronization by means of a common Bowden cable. The Bowden cable is connected with the back of the seat so that when the seat back is folded forward, the rotary drop latches are unlocked and the seat cushion part together with the seat back can be folded forward.

In German Patent Documents DE-AS 12 86 922 and DE-GM 18 24 238 an actuating arrangement is shown in which the rotary drop latches can be unlocked by a common manual lever provided in the area of the fitting between the seat back and the seat cushion part. When the manual lever is operated, the two rotary drop latches are unlocked in synchronization by actuating the manual lever by means of a rod including a connecting rod.

Finally, in the actuating arrangement known from German Patent Document DE 41 42 924 A1 both rotary drop latches can be unlocked remotely in synchronization by an associated Bowden cable.

A goal of the invention is to provide an actuating device which ensures a secure locking of the seat back to the seat cushion part with the rotary drop latches being released with reduced maintenance expense and higher operating safety.

This goal is achieved according to the invention by an actuating arrangement for a vehicle seat whose seat back can be folded forward around a pivot axis into a deflected position to facilitate entry and exit, with the seat back being secured in its folded-back end position by bilaterally provided rotary drop latches that are synchronously remotely unlockable by a common actuating element and with a tension arrangement provided for remote unlocking, wherein the rotary drop latches are rotationally coupled by a connecting rod and operable connected with the actuating element by a single tension strand, and wherein the rotary drop latches are rotationally coupled by a connecting rod and operably connected with the actuating element by a single tension strand, and wherein the rotary drop latches are mounted with their rotary drop axles on the seat cushion part and, in their locking position with the seat back folded back, each fit around an associated retainer structure of the seat back in a locking fashion.

Advantageous embodiments of the actuating device according to the invention together with advantageous improvements on the invention are described herein and in the claims.

The connecting rod ensures in simple fashion that both rotary drop latches operate in permanent synchronization under all operating conditions. Reducing the tension arrangement by one tension strand also contributes to operating safety since correspondingly less friction must be overcome when operating. In addition, the maintenance expense is reduced as well since the connecting rod requires no maintenance, by contrast with a cable.

By locating the rotary drop latches on the seat cushion part, the weight of the seat back can be advantageously reduced. In addition, no space is required in the seat back for the connecting rod.

When the actuating element cooperates through a Bowden cable and control mechanics with one of the rotary drop latches, the operating safety of the locking system can be increased in a simple manner. In particular, it can be ensured that the rotary drop latches can engage only under their spring loads when the seat back has reached its folded-back end position.

A lightweight yet very stable design is achieved by a U-shaped design for the rotary drop latches. Preferably, the loops cooperate with an associated retaining leg that is part of the supporting hardware of the seat back, required in any case.

As a result of the height adjustability of the supporting structure, a largely zero-play locking of the free leg ends by the loops can be achieved.

In an integral seat, the latching mechanics can be reinforced on the side that is subjected to a greater load in the event of a collision in simple fashion by making the loop on this side thicker.

Other objects, advantages and novel features of the present invention will become apparent from the following detailed description of the invention when considered in conjunction with the accompanying drawings.

DETAILED DESCRIPTION OF THE DRAWINGS

Figure 1:
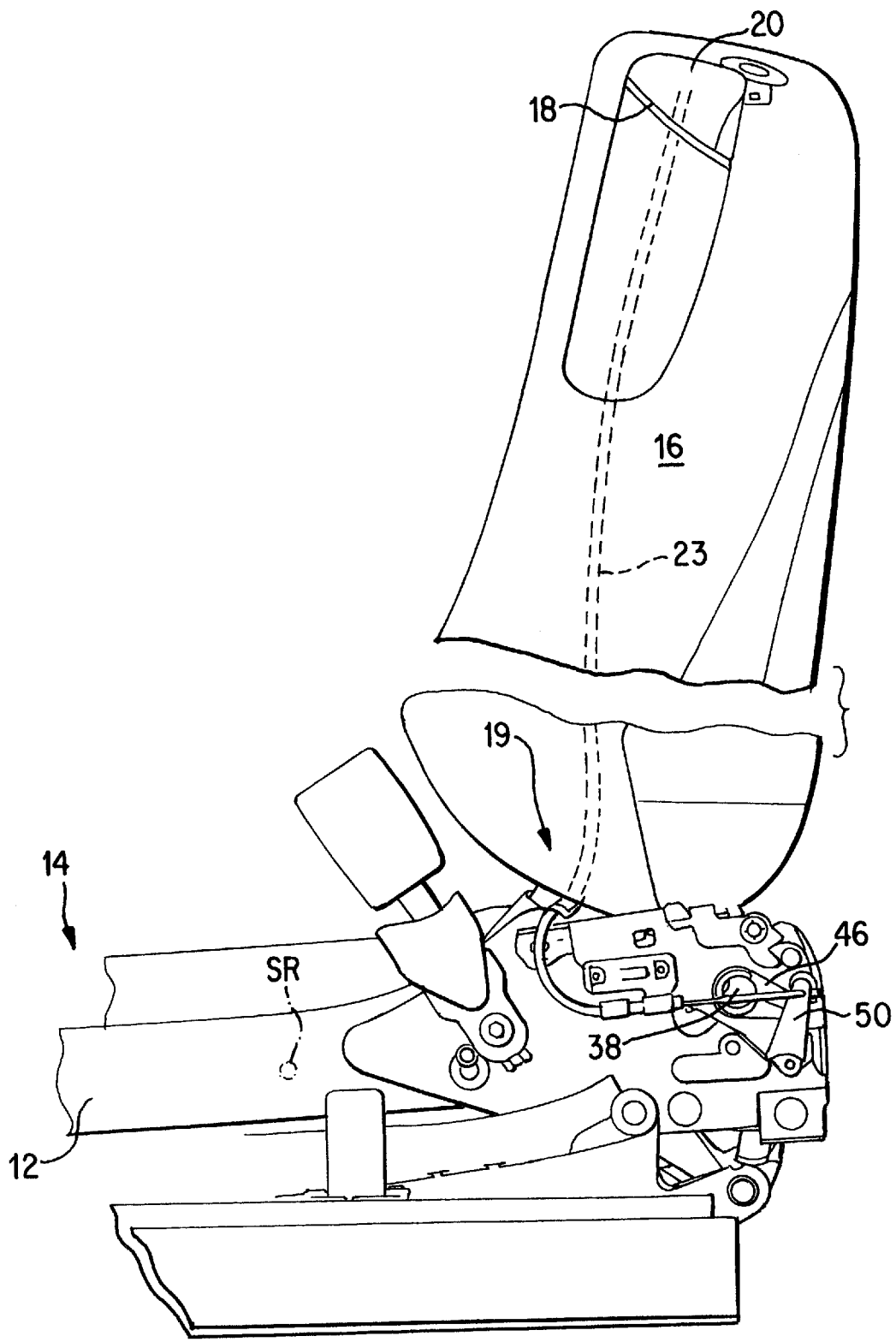
FIG. 1 is a schematic side view of a vehicle seat with a seat back that can be folded forward and an actuating arrangement constructed according to a preferred embodiment of the invention.

FIG. 1 shows in a side view a lengthwise adjustable vehicle seat designed with an integrated seatbelt system, said seat comprising a seat frame 12 height-adjustable by a mechanism formed as part of a seat cushion part 14. A seat back 16 is located on the seat frame 12 of seat cushion part 14, said seat back being capable of being folded forward, into a deflected position around pivot axis SR located offset forward, so that when seat back 16 is folded forward at the same time a drive motor of a lengthwise adjustment device, not shown, is activated by a microswitch and the vehicle seat is moved forward by a motor. In the upper side area of seat back 16, an upper belt anchoring point 18 is fastened through which the safety belt emerges from the interior of the vehicle seat. Above belt anchoring point 18 is an actuating element 20 by which rotary drop latches 31 (FIGS. 2a, 2b) can be moved in synchronization under remote control by a tension strand 23 of a tension arrangement 19 designed here as a Bowden cable, with the seat back 16 being capable of being brought from the folded-back position into the folded-forward deflected position.

Figures 2A, 2B:
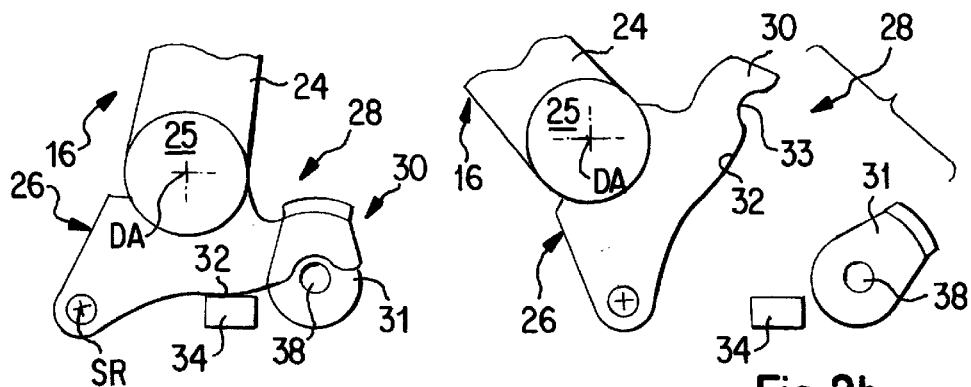
FIGS. 2a and b each show a schematic side view of the seat back with lateral supporting hardware mounted on a pivot axis, said hardware being lockable to the seat frame by the associated rotary drop latches.

In FIGS. 2a and 2b, in a schematic view in each case, a back frame 24 of seat back 16 is shown which can be pivoted by its two supporting fittings 26 around pivot axis SR with the two supporting fittings 26 being mounted inside, in the lateral lower area of the seat back 16, on seat frame 12 (FIG. 1) of seat cushion part 14. In FIG. 2a, seat back frame 24 is shown in the folded-back position with supporting fittings 26 and in FIG. 2b in the forward-folded deflection position. On the two supporting fittings 26, at a distance behind the front pivot axis SR of seat back 16, a rotary joint 25 is located on each side, around whose rotary joint axis DA the seat back frame 24 pivots so that the angle of backrest 16 can be adjusted. The supporting fittings 26 each have a retaining leg 28 projecting rearward which terminates at a distance behind the associated rotary joint 25 of seat back 16. Retaining legs 28 each have a free leg end 30 which, with seat back 16 in the folded-back end position of seat back 16, is locked by an associated rotary drop latch 31 that can be remotely locked by the actuating element 20 on seat frame 12 of seat cushion part 14. The form and function of the rotary drop latches 31 and retaining legs 28 is explained in greater detail, particularly with reference to FIG. 4.

Figures 3A, 3B, 4:
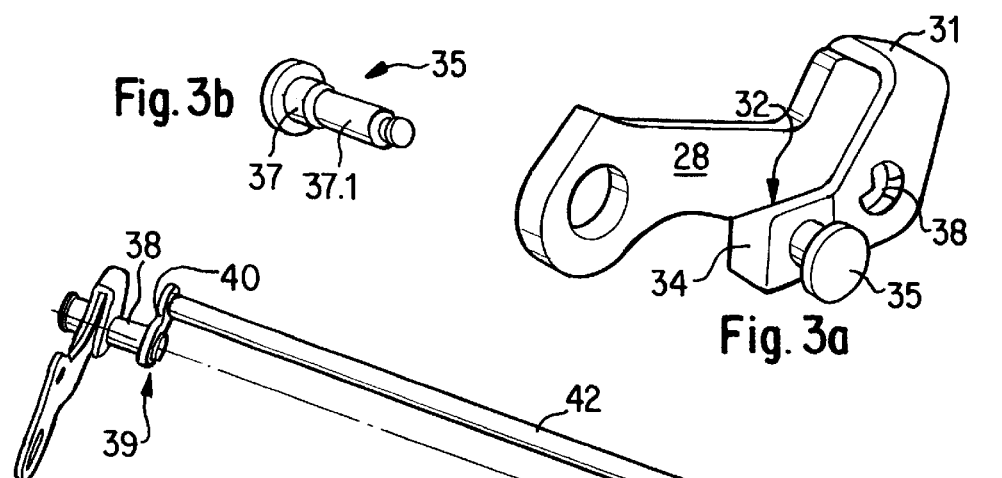
FIGS. 3a and b show a perspective view of a retaining leg secured by a rotary drop latch and supported on a supporting structure on the seat frame, as well as a perspective view of a pin by which the supporting structure is located on the seat frame.
FIG. 4 is a perspective view of the two rotary drop latches that are rotationally coupled with one another by a connecting rod.

In the folded-back end position, the supporting fittings 26 with support points 32 are supported on supporting structure 34 located on seat frame 12 of seat cushion part 14. Support points 32 are preferably located at a distance behind rotary joint 25 of seat back 16. In FIG. 3a, one of the retaining legs 28 secured by rotary drop latch 31 is shown, beneath whose support point 32 supporting structure 34 are secured by a bolt 35 and a matching nut on seat frame 12, not shown in FIG. 4. Bolt shaft 37 of bolt 35 according to FIG. 3b has a middle section 37.1 located eccentrically relative to the bolt axis to receive supporting structure 34 so that the latter can be fastened height adjustably on seat frame 12. The height adjustability of supporting structure 34 allows largely zero-play locking of the free leg ends 30 by rotary drop latch 31.

Rotary drop latches 31, as may be seen by comparing FIGS. 2 to 4, are designed as approximately U-shaped rotary latches each of which has a locking axis 38 designed as an axle stub. The two axle stubs 38 rest on a common drop axis MD. Lever arms 40 are fastened on the inner ends 39 of axle stubs 38, which are connected permanently to one another by means of a connecting rod 42 located eccentrically to the drop axis MD of axle stub 38. Thus, the two rotary drop latches 31 associated with the respective retaining legs 28 are rotationally coupled with one another with the entire unit with both rotary drop latches 31, axle stubs 38, lever arms 40, and connecting rod 42 mounted on seat frame 12 so they can rotate around axle stub 38. It is also evident from FIG. 4 that rotary drop latch 31 is designed to be stronger on the side of belt anchoring point 18 since in an integral seat, an especially high force acts on the supporting fitting 26 on this side, for example in an accident. In the locking position of the U-shaped loops 31, the loops fit around the leg end 30 of the associated retaining leg 28 so that the respectively associated supporting fitting 26 is secured at the front to the pivot axis SR and at the rear by rotary drop latches 31 on seat frame 12. To unlock the leg ends 30 the rotary drop latches 31, as can be seen from FIG. 2b, are rotated rearward clockwise around rotary drop axis MD; accordingly, they are moved forward to lock leg ends 30 counterclockwise. Leg ends 30 of retaining leg 28 in the vicinity of rotary drop axis 38 or connecting rod 42, show an indentation 33 (FIG. 2b). It would also be possible for the support points 32 of supporting fittings 26 to abut the axle stub 38 in the vicinity of indentations 33; in this case, no supporting structure 34 for supporting the support hardware 26 would have to be provided on seat frame 12.

Figure 5A:
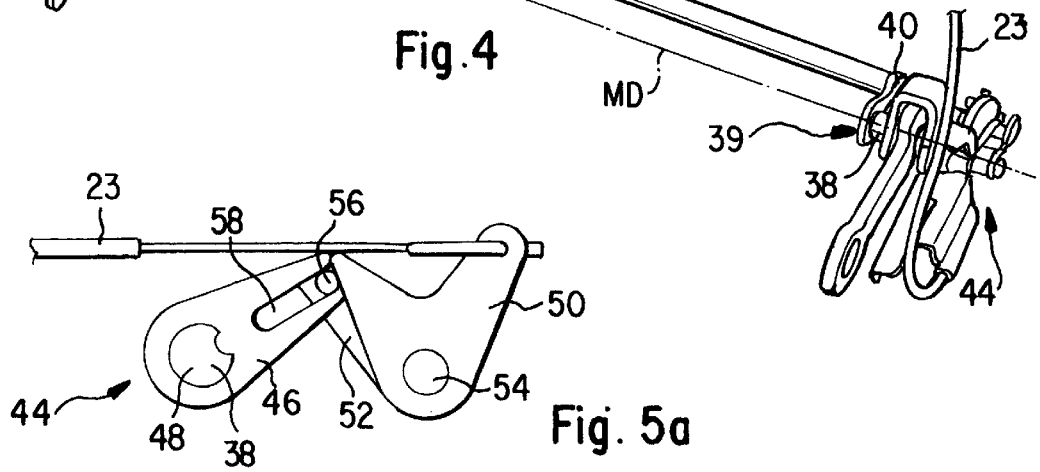
FIGS. 5a and b each show a schematic side view of parts of the control mechanics for locking and unlocking the rotary latches in the locked position.
Figure 5B:
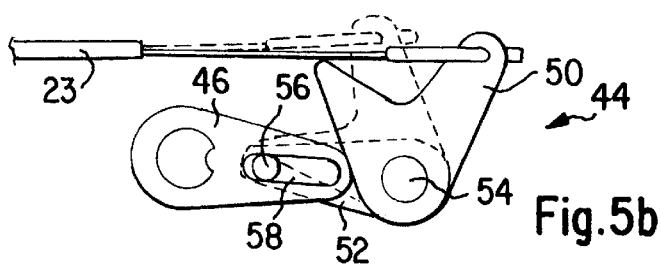

In FIGS. 4, 5a, and 5b, parts of a control mechanism 44 can be seen in a schematic side view, said mechanism serving to secure and release the rotary drop latches 31. The control mechanism 44 comprises a rotatably mounted bracket arm 46 mounted nonrotatably on one end 48 of the rotary drop axis MD on the right in FIG. 4. At a distance from drop axis 38 an approximately V-shaped tension lever 50 and a pin lever 52 are located one behind the other and rotatably mounted to turn around a lever axis 54 with a bracket pin 56 projecting from pin lever 52 and engaging an elongate hole 58 in bracket arm 46. The V-shaped tension lever 50 and pin lever 52 are not connected nonrotatably with one another. Bowden cable 23 is fastened to the rear arm of V-shaped tension lever 50.

If the tension lever 50 is then actuated through Bowden cable 23 by the actuating element 20 and rotated counter-clockwise against the spring force of a coil spring, not shown, so the tension lever 50 by its forward arm moves the bracket pin 56 with it in a pivoting movement so that pin lever 52 and tension lever 50 are rotated out of the position shown in FIG. 5a into the position shown in FIG. 5b. The bracket arm 46 is turned clockwise by means of bracket pin 56 guided in elongate hole 58. The rotary drop latches 31 connected nonrotatably with the bracket arm 46 by drop axis 38 are also rotated clockwise causing the two free leg ends 30 (FIG. 2b) to be released to allow seat back 16 to be folded forward. Pin lever 52 is held in the lower position shown in FIG. 5b, possibly by a safety device, not shown, when seat back 16 is pivoted forward. When actuating element 20 is released and the tension lever 50 swings back clockwise, the pin lever 52 will then remain in place until the seat back 16 has again reached its folded-back end position; the same is true for the movement-coupled bracket arm 46 with pin lever 52 that is mounted on one of the drop axes 38. After seat back 16 folds back, the safety device ensures that pin lever 52 and hence bracket lever 46 as well are pivoted back into their initial positions shown in FIG. 5a whereupon the rotary drop latches again assume their locking position. If, on the other hand, the actuating element 20 and hence Bowden cable 23 are actuated and the seat back 16 does not fold forward, the safety device ensures that rotary drop latches 31 are moved backward once again into their position that holds retaining leg 28 firmly after actuating element 20 is released.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An actuating arrangement for a vehicle seat comprising:
    a vehicle seat whose seat back can be folded forward around a pivot axis into a deflected position to facilitate entry and exit, with the seat back being secured in its folded-back end position by bilaterally provided rotary drop latches that are synchronously remotely unlockable by a common actuating element, a tension arrangement being provided for remote unlocking;
    wherein the rotary drop latches are rotationally coupled by a connecting rod and operably connected with the actuating element by a single tension strand; and
    wherein the rotary drop latches are mounted with their rotary drop axles on the seat cushion part and, in their locking position with the seat back folded back, each fit around an associated retainer structure of the seat back in a locking fashion.

2. Actuating arrangement according to claim 1, wherein the actuating element is located laterally on the seat back and is connected by a Bowden cable with a control mechanism associated with one of the rotary drop latches.

3. Actuating arrangement according to claim 1, wherein the rotary drop latches are designed as U-shaped loops.

4. Actuating arrangement according to claim 1, wherein leg ends of retaining legs of the retainer structure in the locking position are supported on height-adjustable supporting structure on the seat frame.

5. Actuating arrangement according to claim 1, wherein the rotary drop axles are designed as axle stubs and connected with one another by lever arms with the associated end of the connecting rod.

6. Actuating arrangement according to claim 1,
    wherein the vehicle seat is an integral seat with an integral seatbelt system, and
    wherein the rotary drop latch is reinforced on a side of an upper belt anchoring point and the tension strand and a control mechanism is located on a side of the reinforced rotary drop latch.

7. Actuating arrangement according to claim 1,
    wherein a control mechanism is mounted on an end of drop axles projecting from the drop latches and secured to the seat cushion part.

8. Vehicle seat arrangement comprising:
    a seat cushion,
    a seat back pivotally movable between an upright seating position and a folded position accommodating passenger exiting and entering of a vehicle,
    rotary latches disposed on respective opposite lateral sides of the seat cushion, and
    a remotely operable latching assembly operable to move the rotary latches from a position latching the seatback in the upright position to a position releasing the seatback to move to the folded position,
    wherein the latching assembly includes a single tension member operable to rotate both latches.

9. Vehicle seat arrangement according to claim 8, wherein the latches are side mounted on axle stubs rotatably mounted at the seat cushion and wherein lever arms connect said axle stubs with a connecting rod extending laterally at the seat cushion.

10. Vehicle seat arrangement according to claim 9,
    wherein the single tension element is a Bowden cable connected by a control mechanism with the rotary latches.

11. Vehicle seat arrangement according to claim 10, wherein the rotary latches are configured as U-shaped loops which engage over respective rearward extending retaining legs of the seat back when in a position latching the seat back in the upright position.

* * * * *